Patented May 7, 1940

2,199,386

UNITED STATES PATENT OFFICE 2,199,386

GRANULAR ARTICLE CONTAINING CELLULOSE ETHERS AND SHELLAC

Shailer L. Bass and Earle L. Kropscott, Midland, Mich., assignors to The Dow Chemical Company, Midland, Mich., a corporation of Michigan No Drawing. Application March 23, 1939, Serial No. 263,805

6 Claims. (Cl. 106—40)

This invention relates to a granular article of manufacture consisting of a cellulose lower alkyl ether and shellac, and to a method whereby the said article, having certain desired characteristics, may be produced.

It is among the objects of the invention to provide an article consisting of a uniform mixture of shellac and a cellulose lower alkyl ether without subjecting the shellac to heat-hardening or polymerizing conditions, in such a manner that the article produced will be easily soluble in lacquer solvents, or capable of employment as a "hot melt" coating, or as a plastic molding composition.

Several unsuccessful methods of mixing shellac and ethyl cellulose were tried in attempts to attain the foregoing objects. These methods included (a) mixing solutions of the two ingredients, and driving off the solvent; (b) mixing solutions of the two ingredients and precipitating the mixed solid by addition of a non-solvent; (c) mixing the dry materials in a heated mixer; and (d) adding powdered shellac to an agitated aqueous suspension of ethyl cellulose. The first two methods require large volumes of solvent, and it is difficult to remove solvent from shellac-containing mixtures. The products obtained were sticky, hard to handle, and difficult to redissolve. The third method (c) results in a "set-up" or polymerized shellac composition which cannot be dissolved in lacquer solvents, incorporated in hot melts, or used in molding operations. The fourth method (d) does not provide a uniform product. The shellac does not combine with the cellulose ether, but tends to separate out and collect on the sides of the mixing vessel.

We have now found that a granular product can be made of substantially uniform size, and substantially uniform in composition, which dissolves readily in lacquer solvents, and which in other respects accomplishes the objects of the invention, by adding a concentrated solution of shellac, in a water-miscible solvent therefor, to an aqueous suspension of a water-wet, water-insoluble lower alkyl ether of cellulose, preferably at a temperature of 60°–100° C., while vigorously agitating the cellulose ether suspension. The proportion of shellac to cellulose ether may vary from 2 to 70 parts of shellac for each 98 to 30 parts of cellulose ether. There is thus obtained a free-flowing granular article which is easily separated from water, as by centrifuging, most of which is of a size to pass through a 10 mesh screen and to rest on a 20 mesh screen. The granules may be dried, as for example in a warm oven, or shelf drier, and when dry, are characterized by uniformity of composition and ease of solubility in lacquer solvents, having a solution rate in 95 per cent ethanol nearly as fast as that of the cellulose ether alone, and much faster than that of shellac alone.

The water-miscible solvents for shellac include methyl and ethyl alcohol, aqueous borax solution, and aqua ammonia. Any of these solvents may be employed when introducing a solution of shellac into an agitated slurry of a lower alkyl ether of cellulose.

For best results it is preferable to use an aqueous suspension of water-wet cellulose ether, the particles of which are porous and absorptive. This condition may be attained suitably by pouring into water a solution of a water-insoluble cellulose ether in a water-miscible solvent. For example, an alcoholic solution of ethyl cellulose may be poured into water, and the mixture stirred to produce a precipitate of ethyl cellulose particles in a swelled, absorptive condition. Such precipitation, as applied to freshly prepared cellulose ethers, is described in U. S. Patents 2,073,002 and 2,107,005. Another way in which a suspension of the cellulose ether may be prepared in preferred form is to stir or beat the ether with an aqueous menstruum containing a water-miscible solvent and swelling agent for the cellulose ether, such as methanol, ethanol or acetone, in concentration too low to dissolve the ether, but high enough to cause swelling. Thus, dry ethyl cellulose may be stirred or beaten with a 20 per cent solution of ethanol in water. Other swelling agent solutions which may be used in like manner include aqueous methanol or aqueous acetone, and the like.

If the cellulose ether employed in the slurry is not water-wet and absorptive, the cellulose ether-shellac granules are less uniform than those prepared according to the preferred embodiment of the invention, appearing to consist of the cellulose ether coated with shellac.

The actual size and uniformity of the shellac-cellulose ether granules may vary considerably, but this variation may be controlled by controlling the temperature of granule formation and the agitator speed in the mixing vessel. The higher the temperature employed, the smaller are the granules obtained under otherwise constant conditions. Likewise, with other conditions constant, the higher the agitator speed, the smaller the granules produced.

The following table illustrates a few of the properties of several ethyl cellulose-shellac mixtures prepared according to the invention. The shellac employed was a uniform grade having a polymerizing time of 25 minutes at 160°–165° C. and a softening point of about 70° C. The ethyl cellulose employed contained 48.4 per cent ethoxyl, and its 5 per cent solution in 80:20 toluene-ethanol had a viscosity of 10 centipoises. A 10 per cent solution in the same solvent had a viscosity of 70 centipoises. The granules were prepared by adding the required amount of a concentrated solution of shellac in ethanol to a suspension of precipitated and undried ethyl cellulose in water at 85° C. with stirring. The alcohol volatilized as the shellac solution was added to the hot aqueous ethyl cellulose suspension. Uniform granules were formed, which were separated by centrifuging from most of the water and dried in a stream of warm air in a shelf drier. The apparent density of the granules is given in the table in terms of bulk density, i. e. grams of the granular product per cubic centimeter. The proportion of ethyl cellulose and shellac employed is recited in the second and third columns of the table. From this proportion, the theoretical ethoxyl content of the product is calculated and compared with an experimentally determined value. It is seen that the experimental and theoretical values agree closely, and that each batch of granules was quite uniform in composition.

Table

| Run No. | Composition | | Apparent density of granules | Percent ethoxy | | Softening point, °C. | Viscosity 10% in 80:20 toluene-ethanol |
|---|---|---|---|---|---|---|---|
| | Ethyl cellulose | Shellac | | Calc. | Found | | |
| 1 | 98 | 2 | 0.29 | 47.4 | 47.2 | 166–168 | 61.0 |
| 2 | 95 | 5 | 0.30 | 46.0 | 46.3 | 162–164 | |
| 3 | 90 | 10 | 0.32 | 43.6 | 44.5 | 158–160 | 44.0 |
| 4 | 80 | 20 | 0.28 | 38.7 | 38.3 | 144–146 | 30.7 |
| 5 | 70 | 30 | 0.34 | 34.0 | | 133–135 | 30.5 |
| 6 | 60 | 40 | 0.32 | 28.4 | 29.0 | 120–122 | |
| 7 | 50 | 50 | 0.34 | 24.2 | 25.9 | 110–115 | |

Useful products may be obtained in the range from 2 to 70 per cent shellac, and from 98 to 30 per cent ethyl cellulose, or equivalent, the preferred article containing from 5 to 50 per cent, and correspondingly from 95 to 50 per cent of ethyl cellulose, or other lower alkyl ether of cellulose. The products described in the table have solution rates of about 5 to 15 minutes when freshly prepared, and from 10 to 30 minutes after 3 months aging. Ethyl cellulose has a similar solution rate, while that of shellac is about 30 to 90 minutes or longer, increasing with age. Solution rate as determined on these samples is defined as the time required to dissolve 1 gram of the solid in 10 milliliters of 95 per cent ethanol with stirring at room temperature.

The products described in the table could also be used as molding compositions, and those containing over 30 per cent of shellac could be used as "hot-melt" coatings. When employed as hot-melts, they provided a clear, hard but flexible coating, and had sufficiently low viscosity to flow easily when melted and applied in the usual manner. They could be held at temperatures above the softening points for considerable time without exhibiting polymerization of the shellac.

The invention has been illustrated with reference to ethyl cellulose-shellac granules, but is not limited thereto. Similar products may be made in the manner described from other water-insoluble lower alkyl ethers of cellulose, examples of which are water-insoluble methyl cellulose, propyl cellulose or butyl cellulose, or isomers thereof, or mixed lower alkyl ethers of cellulose, such as methyl ethyl cellulose, ethyl propyl cellulose or ethyl butyl cellulose.

Other modes of applying the principle of our invention may be employed instead of those explained, change being made as regards the materials employed, provided the ingredients stated by any of the following claims or the equivalent of such stated ingredients be employed.

We therefore particularly point out and distinctly claim as our invention:

1. The method which consists in adding a concentrated solution of shellac in a water-miscible solvent for shellac to an aqueous suspension of a water-wet, water-insoluble lower alkyl ether of cellulose, while vigorously agitating the said aqueous suspension, thereby to produce a free-flowing granular article which, when dry, is characterized by uniformity of composition and ease of solubility in lacquer solvents.

2. The method which consists in adding a concentrated solution of shellac in a water-miscible solvent for shellac to an aqueous suspension of a water-wet, water-insoluble lower alkyl ether of cellulose, while vigorously agitating the said aqueous suspension at a temperature from 60° to 100° C., thereby to produce a free-flowing granular article, most of which is of a size to pass through a 10 mesh screen and rest on a 20 mesh screen, containing from 30 to 98 per cent of the cellulose ether and correspondingly from 70 to 2 per cent of shellac, the said granular article when dry being characterized by uniformity of composition and ease of solubility in lacquer solvents.

3. The method which consists in adding a concentrated alcoholic solution of shellac to an aqueous suspension of a water-wet, water-insoluble lower alkyl ether of cellulose, while vigorously agitating the said aqueous suspension at a temperature from 60° to 100° C., thereby to produce a free-flowing granular article which, when dry, is characterized by uniformity of composition and ease of solubility in lacquer solvents.

4. The method which consists in adding a concentrated solution of shellac in aqua ammonia to an aqueous suspension of a water-wet, water-insoluble lower alkyl ether of cellulose, while vigorously agitating the said aqueous suspension at a temperature from 60° to 100° C., thereby to produce a free-flowing granular article which, when dry, is characterized by uniformity of composition and ease of solubility in lacquer solvents.

5. The method which consists in adding a concentrated solution of shellac in a water-miscible solvent for shellac to an aqueous suspension of a precipitated and undried water-insoluble lower alkyl ether of cellulose, while vigorously agitating the said aqueous suspension, thereby to produce a free-flowing granular article which, when dry, is characterized by uniformity of composition and ease of solubility in lacquer solvents.

6. The method which consists in adding a concentrated solution of shellac in a water-miscible solvent for shellac to an aqueous suspension of water-insoluble ethyl cellulose, while vigorously agitating the said aqueous suspension at a temperature from 60° to 100° C., and drying the so-formed free-flowing granules, the product being characterized by uniformity of composition and ease of solubility in lacquer solvents.

SHAILER L. BASS.
EARLE L. KROPSCOTT.